G. A. PRINCE, C. E. BACON & C. F. S. THOMAS.
Swell for Melodeons.
No. 2,666. Reissued July 2, 1867.
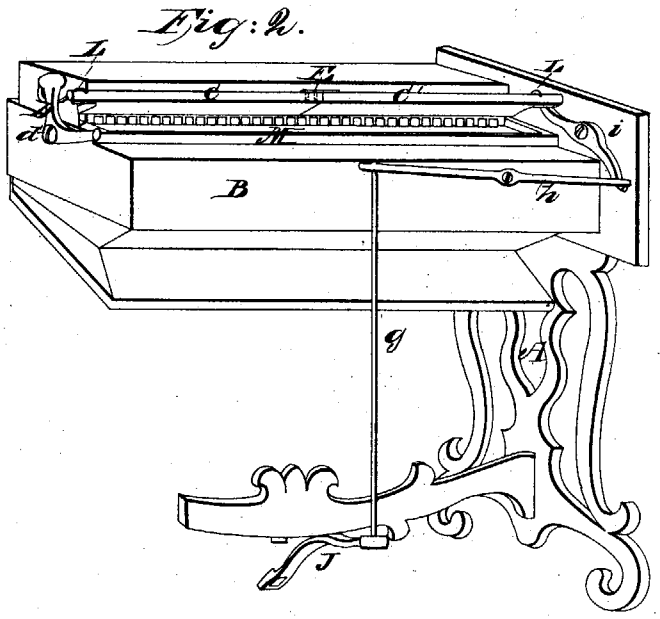
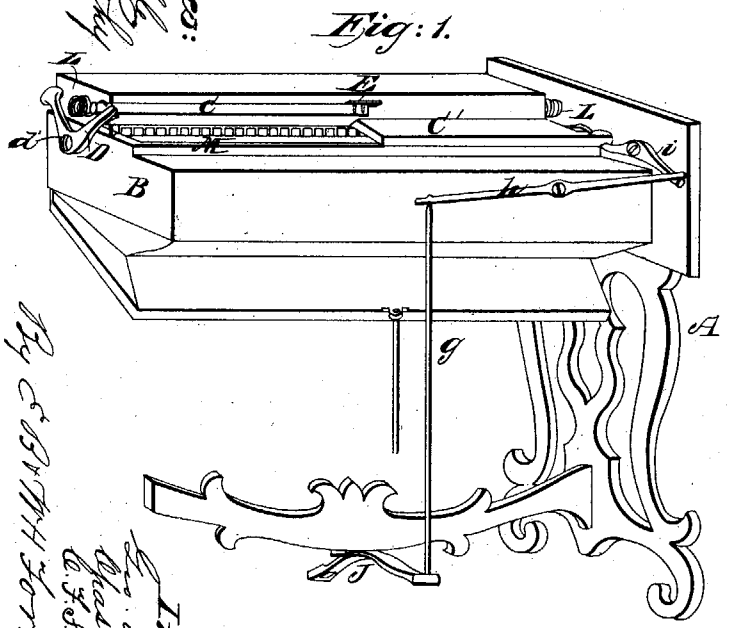
Witnesses:
B. H. Muehly
H. Sanquworthy
Inventors:
Geo. A. Prince
Chas. E. Bacon
C. F. S. Thomas
By E. B. & W. H. Forbush Attys
N. PETERS, Photo-Lithographer, Washington, D. C.

United States Patent Office.

GEORGE A. PRINCE, CHARLES E. BACON, AND CALVIN F. S. THOMAS, OF BUFFALO, NEW YORK, ASSIGNEES BY MESNE ASSIGNMENTS OF THOMAS F. THORNTON.

*Letters Patent No.* 12,938, *dated May* 22, 1855; *reissue No.* 2,666, *dated July* 2, 1867.

IMPROVEMENT IN SWELLS FOR MELODEONS.

The Schedule referred to in these Letters Patent and making part of the same.

TO ALL WHOM IT MAY CONCERN:

Be it known that THOMAS FOSTER THORNTON, of the city of Buffalo, county of Erie, and State of New York, heretofore invented an Improved Swell for Melodeons, and other reed musical instruments, for which Letters Patent of the United States were duly granted to George A. Prince and Thomas Stephenson as the assignees of the whole interest of the said Thornton on the twenty-second day of May, in the year one thousand eight hundred and fifty-five, number 12,938. Also, be it known that the said George A. Prince and Thomas Stephenson afterward, by proper deed of assignment, antedated May 1, 1865, transferred, sold, and set over their whole interest, right, and title in and to the said invention and Letters Patent to George A. Prince, Charles E. Bacon, and Calvin F. S. Thomas, of the city of Buffalo aforesaid, composing the firm of George A. Prince & Co.

Now, therefore, we, the said GEORGE A. PRINCE, CHARLES E. BACON, and CALVIN F. S. THOMAS, assignees, as aforesaid, by virtue of the statute in such case made and provided, do hereby declare that the following is a full, clear, and exact description of the said invention and improvement, reference being had to the accompanying drawings, making a part of this specification, in which—

Figure I is a rear perspective view of a melodeon, one-half of the swell-valve of which being shown closed and the other half open.

Figure II is a rear perspective view of a melodeon showing the whole of the swell open.

The nature of this invention relates to the construction, application, and use of an improved swell-valve in connection with melodeons, and all other reed musical instruments, that is to say, a swell-valve so constructed that a part of the valve may be opened in a manner to uncover only a part of the notes without uncovering or opening the other portion, so that a loud, full tone may be produced in the upper half of the instrument for solos, and at the same time a subdued tone in the other half of the instrument as an accompaniment, and thereby increase, diminish, modify, and vary the tone of the instrument in a greater degree of perfection than has heretofore been attained. All parts of the instrument except the swell-valve may be constructed in any common and well-known manner, and therefore a description of such well-known parts further than a general reference is not deemed to be essential. Only a part of the instrument, sufficient to show the construction and operation of the improvement claimed, is represented in the drawings.

The framework of the instrument is represented at A. B is the tube or sounding-board, of common construction. The "swell" or swell-valve, which is the distinctive matter of this invention, is represented at C C′, and is made in such manner that one part thereof may be opened and operated independently of the other part. This movement of the upper half of the valve is effected by means of the bent lever D, which is pivoted to the instrument, as shown at *d′*, one end of which lever bears against the valve-stem and the other end projects and is extended in a manner to be in easy reach of the operator, so that he can at will press with his hand upon the lever and open this part of the valve without moving or disturbing the other part of the valve. A cleat, E, is made fast to this part of the valve, which projects slightly and overlaps the part C′, so that when the part C′ is opened the part C will be opened at the same time. A series of levers, *g h i*, are connected with the pedal J and the valve C′, so that the swell-valve may be wholly opened at once by the pedal and in a common manner, the part C′, by means of the cleat-connection E, acting upon the part C. With the ordinary swell there an be but one change of tone produced, viz, when the swell is closed the tone is low and soft, and when open it is loud, and this change from soft to loud appertains to the instrument as a whole; but by this improvement the desirable end is attained of producing a loud tone in the upper half of the instrument for playing solos, and at the same time a subdued tone in the other half for accompanying the same. This is a new result, and a great acquisition to the harmony and power of the instrument. The accomplishment of this result is the purpose of this invention, and the feature which distinguishes it from all other "swells" heretofore in use. Other particular means may perhaps be devised for constructing the valve so as to admit of uncovering only a part of the notes, but the grand idea of this invention is in so constructing the swell-valve that a portion of it may be opened at pleasure in a manner to admit of a free escape of the sound from only a portion of the notes, while other portions of the notes are covered by other parts of the valve. In Fig. I one-half of the swell-valve is represented as open. In Fig. II the valve as a whole is represented as open. The operator has such command of the instrument as to open one-half or the whole of the valve, as may be required for the most perfect playing of the instrument. L is a spring acting upon the upper half of the valve to close it, and L′ is a spring acting upon the lower half of the valve. M represents the apertures or tubes in which the reeds are placed. This improvement is applicable to melodeons, melopeans, seraphines, reed organs, and all reed instruments.

What we claim as the invention of the said THOMAS FOSTER THORNTON, and desire to secure by Letters Patent, is—

So constructing and operating the swell-valve of melodeons and other reed musical instruments that a part of the valve may be opened in a manner to uncover and permit a free escape of the sound from only a part of the notes, while other portions of the notes remain covered by other portions of the valve, for the purpose and substantially as described.

GEO. A. PRINCE,
CHAS. E. BACON,
C. F. S. THOMAS.

Witnesses:
E. B. FORBUSH,
B. H. MUEHLE.